United States Patent [19]

Yanagi

[11] Patent Number: 5,598,286
[45] Date of Patent: *Jan. 28, 1997

[54] LIQUID CRYSTAL DISPLAY DEVICE PROVIDED WITH LIQUID CRYSTAL ELEVATION STOPPERS

[75] Inventor: Masahiro Yanagi, Kyoto, Japan

[73] Assignee: Rohm Co. Ltd., Kyoto, Japan

[*] Notice: The term of this patent shall not extend beyond the expiration date of Pat. No. 5,477,361.

[21] Appl. No.: 494,092

[22] Filed: Jun. 23, 1995

Related U.S. Application Data

[63] Continuation-in-part of Ser. No. 174,058, Dec. 28, 1993, Pat. No. 5,477,361.
[51] Int. Cl.$^6$ ............... G02F 1/1335; G02F 1/1333; G02F 1/1339
[52] U.S. Cl. ............................ 349/58; 349/84
[58] Field of Search ............... 359/80, 83, 62

[56] References Cited

U.S. PATENT DOCUMENTS 5,477,361 12/1995 Yanagi ................................ 359/80

Primary Examiner—Wael Fahmy
Assistant Examiner—Fetsum Abraham
Attorney, Agent, or Firm—Nikaido, Marmelstein, Murray & Oram LLP

[57] ABSTRACT

A liquid crystal display device including: a pair of transparent substrates; a sealant layer provided between the substrates to give spacing by a predetermined distance; a pair of liquid-crystal-elevation stoppers provided on both sides of the opening and on an outer side of the sealant layer between the substrates, the stoppers including a different member than the sealant layer, the stoppers being coplanar with the peripheral edge, or as to project from the peripheral edge; a liquid crystal material introduced through the opening into the spacing; and a opening-sealing member formed at end in the vicinity of the opening to seal the liquid crystal material within the spacing between the substrates.

14 Claims, 7 Drawing Sheets

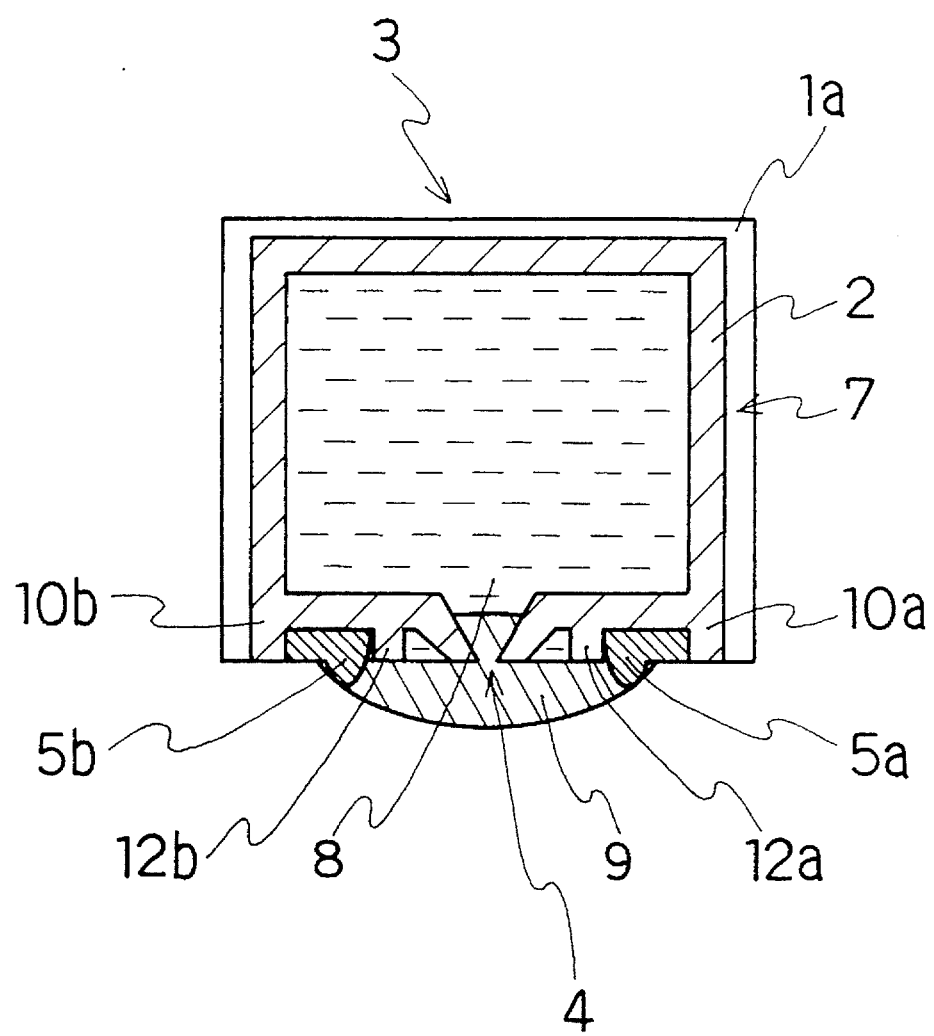

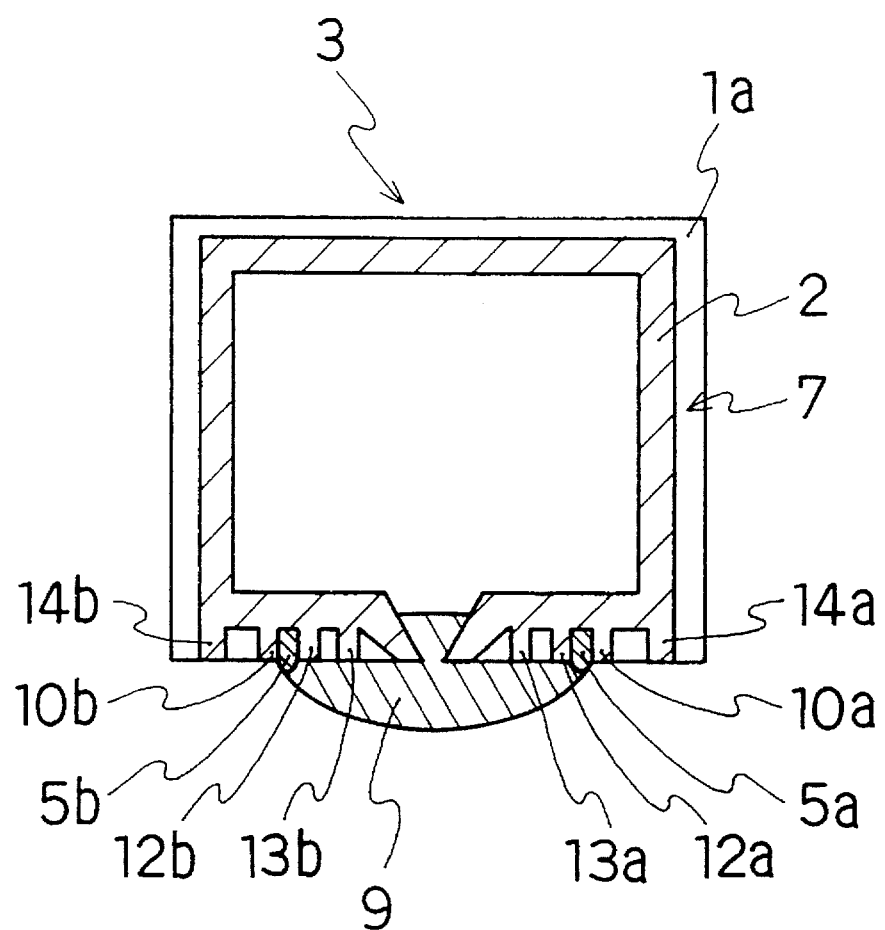

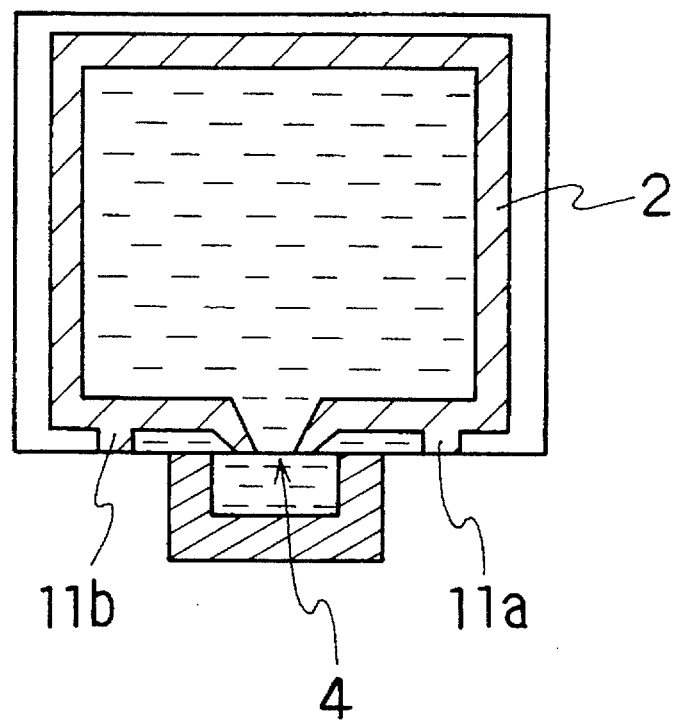

LIQUID CRYSTAL DISPLAY DEVICE PROVIDED WITH LIQUID CRYSTAL ELEVATION STOPPERS

CROSS-REFERENCE TO RELATED APPLICATION

This is a continuation-in-part of application Ser. No. 08/174,058 filed on Dec. 28, 1993 now U.S. Pat. No. 5,477,361.

BACKGROUND OF THE INVENTION

The present invention relates to a liquid crystal display device and, more particularly, to a liquid crystal display device with a sealant layer provided between a pair of transparent substrates of which construction prevents a liquid crystal material from penetrating into the peripheral space outside the sealant layer during the introduction of the liquid crystal material.

According to conventional manner, a liquid crystal display panel comprising a liquid crystal material introduced between transparent substrates is constructed as follows:

A frame-like sealant layer is provided on one transparent substrate so as to be spaced apart by a certain distance off the peripheral edge except the part of a liquid crystal introduction inlet. The transparent substrate is bonded to a counterpart transparent substrate by the sealant layer. The resultant structure is evacuated, and then placed on liquid crystal boat 6 filled with liquid crystal material 8 with liquid crystal introduction inlet 4 immersed in the liquid crystal material 8 thereby the liquid crystal material 8 is introduced between the two substrates 1a and 1b by suction, as shown in FIGS. 5 and 6. Here, FIG. 5 is an explanatory view for exemplifying a manner of introducing a liquid crystal material into a conventional liquid crystal display panel, and FIG. 6 is a sectional view taken along line I—I of FIG. 5.

However, liquid crystal material 8, as shown in FIG. 6 upon introduction thereof, penetrates even into circumference (peripheral space) 7 outside the sealant layer 2 by capillary action. For this reason, a cleaning operation is required to remove the liquid crystal material left in that space 7 after the introduction. Since the space 7 is very narrow, or as narrow as 5 to 10 μm, the cleaning operation involves difficulty. Moreover, since the use of flon is not permitted recently, the cleaning operation is more difficult. If the liquid crystal material is left in an electrode terminal portion due to incomplete cleaning, the electrode terminal tends to be broken, which leads to a degradation of the reliability of the liquid crystal display device.

In an attempt to prevent the liquid crystal material from elevating to the peripheral space 7, there is disclosed in Japanese Unexamined Patent Publication No. 180520/1989 a liquid crystal display device provided with liquid-crystal-elevation stoppers 11a and 11b which are, respectively, formed of protrusions of sealant layer 2 in the shape in section and located on the opposite sides of liquid crystal introduction inlet 4 as shown in FIG. 7.

The provision of such liquid-crystal-elevation stoppers 11a and 11b, however, cannot completely prevent the liquid crystal material from elevating to the peripheral space defined between the transparent substrates. The liquid crystal material elevates into about 30% of panels with such spaces, resulting in a problem of making defective products. In detail, usually a liquid crystal display panel is produced by printing a plurality of sealant layers and the like on a large glass plate and then cutting the large glass at around each of the sealant layers so as to be cut between adjacent any two sealant layers having a frame-like shape. Thus individual panels are obtained. Hence, even if protrusions of the sealant layer are formed to serve as stoppers, they cannot be made to squeeze out of the peripheral edge of the transparent substrates. In addition, minute unevenness is produced on the surface of the sealant layer to cause the liquid crystal material to elevate onto the surface by capillary action. Thus, the stoppers cannot achieve their purpose.

SUMMARY OF THE INVENTION

It is, therefore, an object of the present invention to provide a liquid crystal display device which is capable of completely preventing a liquid crystal material from elevating into a circumference space by capillary action during the introduction thereof and, thereby, eliminating a cleaning method from the production procedure.

According to one aspect of the present invention, there is provided a liquid crystal display device comprising:

a liquid crystal display comprising:

a pair of transparent substrates, a sealant layer provided between the substrates to give spacing by a predetermined distance, a pair of liquid-crystal-elevation stoppers provided on both sides of the opening and on an outer side of the sealant layer between the substrates, said stoppers including a different member than said sealant layer, said stoppers being coplanar with said peripheral edge, or as to project from said peripheral edge, a liquid crystal material introduced through the opening into the spacing, and a opening-sealing member formed at end in the vicinity of the opening to seal the liquid crystal material within the spacing between the substrates.

In the liquid crystal display device of the present invention, the pair of liquid-crystal-elevation stoppers are formed on both sides of the liquid crystal introduction inlet in the circumference of the substrates so as to be coplanar with or squeeze out of the edge of the substrates. Hence, the liquid crystal material can be completely prevented from elevating by capillary action into the circumference outside the sealant layer.

Further, when the first sealant stoppers are provided as extending to the periphery of the transparent substrate on opposite sides relative to the liquid-crystal-elevation stoppers, and/or the second sealant stoppers are provided on the side of the opening relative to the liquid-crystal-elevation stoppers, the material of the liquid-crystal-elevation stoppers can be prevented from elevating to the circumferencial gap of the transparent substrate or to the opening when the liquid-crystal-elevation stoppers are provided.

BRIEF DESCRIPTION OF THE DRAWINGS

FIG. 3 is a cross sectional view illustrating another embodiment of the liquid crystal display element of the present invention;

FIG. 4 is a cross sectional view illustrating still another embodiment of the liquid crystal display element of the present invention;

FIG. 7 is an explanatory sectional view showing an example of a display panel of a prior art liquid crystal display device in which an attempt is made to prevent penetration of a liquid crystal.

DETAILED DESCRIPTION

A liquid crystal display device according to the present invention will now be described by way of one embodiment thereof with reference to the drawings. It should be understood that the present invention will not be limited to the embodiment.

Figure 1:
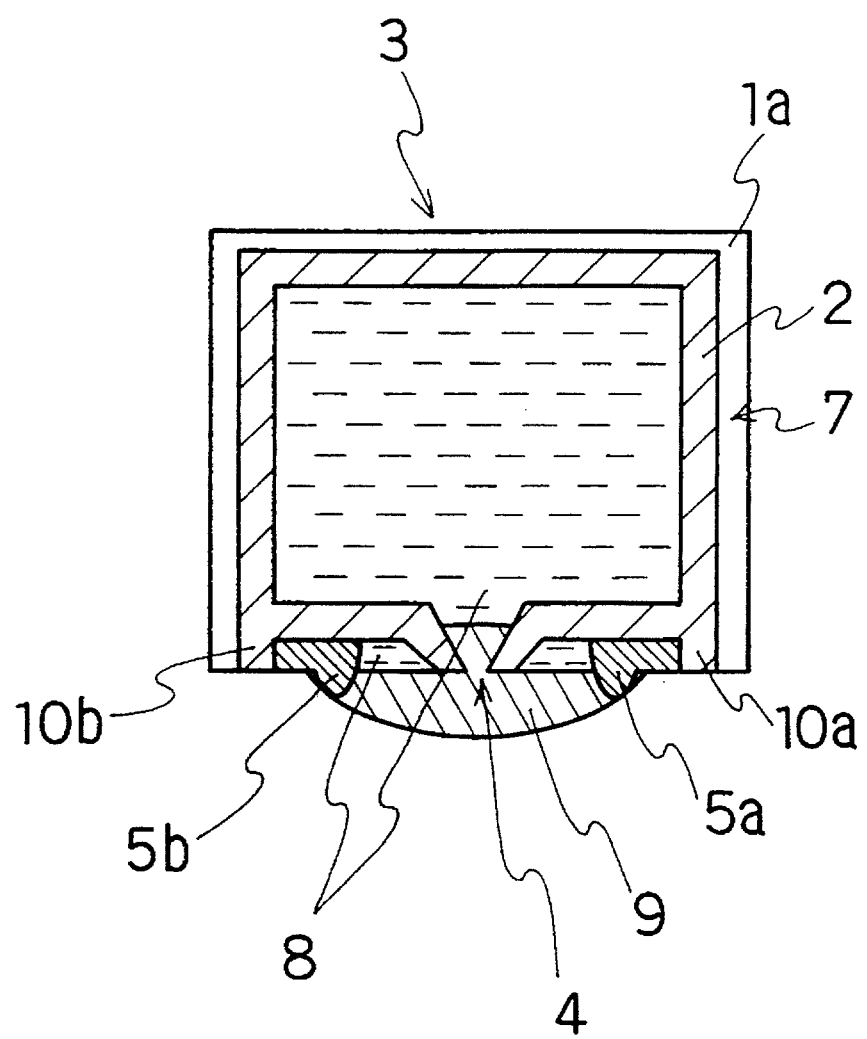
FIG. 1 is an explanatory sectional view showing one embodiment of a liquid crystal display device according to the present invention.

Referring to FIGS. 1 and 2(a) to 2(c), denoted at numeral 1a is a transparent substrate, at numeral 2 a frame-like sealant layer, at numeral 3 a display panel, at numeral 4 a liquid crystal introduction inlet (hereinafter referred to as an opening), at numeral 5a, 5b a pair of liquid-crystal-elevation stoppers, at numeral 6 a liquid crystal material boat, at numeral 7 a circumference, at numeral 8 a liquid crystal material, at numeral 9 a liquid crystal introduction inlet sealing portion (hereinafter referred to as an opening-sealing member) made of for example UV-curable resin, said opening-sealing member 9 being formed as covering the liquid-crystal-elevation stoppers 5a, 5b, and at numeral 10a, 10b a pair of first sealant stoppers. As shown in FIG. 1, the opening is formed by partially cutting the sealant layer 2 which is circularly formed, followed by extending said sealant layer to the edge of circumference of a transparent substrate 1a.

As shown in FIG. 1, in the liquid crystal display device of the present invention are provided the stoppers 5a and 5b to prevent liquid crystal material 8 from elevating to the circumferencial gap 7 during the introduction of liquid crystal material 8. Liquid-crystal-elevation stoppers 5a and 5b are located in the circumferencial gap 7 on opposite sides of the opening 4 so as to be coplanar with or squeeze out of the peripheral edge of the transparent substrates. The material of stoppers 5a and 5b may be composed any material which is curable at room temperature, by heating or by irradiation with ultraviolet ray and immiscible with liquid crystal material 8. Examples of such a material include silicone resin, epoxy resin, and UV-curable resin. Among these the UV-curable resin is especially preferable because it enhances the seal reliability and the amount thereof to be applied is easy to control such a UV-curable resin is also used for opening-sealing member 9.

The size of each of stoppers 5a and 5b can be appropriately selected depending on the size of the intended liquid crystal display device, but the width thereof is preferably about 1 mm. To completely prevent the elevation of liquid crystal material 8, the stoppers 5a and 5b are each made to be coplanar with or squeeze out of the peripheral edge of the transparent substrates. This is because if stoppers 5a and 5b are not formed as such, the liquid crystal material elevates to the space between the edge and the stoppers and, hence, there cannot be achieved the purpose of completely preventing the elevation of the liquid crystal material. Stoppers 5a and 5b are formed of UV-curable resin or the like and, hence, exhibit smooth surface. Accordingly, if they are made to be coplanar with the edge of the substrates, there is no room that allows the elevation of the liquid crystal material by capillary action and, hence, the above-mentioned purpose can be accomplished. However, for the sake of perfection, it is desired that stoppers 5a and 5b be made to squeeze out of the peripheral edge of the substrates. In this case the projecting portions of stoppers 5a and 5b preferably has a length of about 0.3 mm or less.

Further, first sealant stoppers 10a and 10b are respectively provided on opposite sides of the pair of stoppers 5a and 5b to prevent the elevation of the material of the stoppers 5a and 5b. Each of first sealant stoppers 10a and 10b is formed by extending sealant layer 2 at the location outside (in the place opposite to the opening) the stoppers 5a and 5b. The provision of sealant stoppers 10a and 10b allows easy positioning of the stoppers 5a and 5b and prevents the material, still uncured, of the stoppers 5a and 5b from elevating into the circumference 7. In the case of forming either of first sealant stoppers 10a and 10b the material of the stoppers 5a, 5b is prevented from elevating into the circumference therefrom.

Figure 2A:
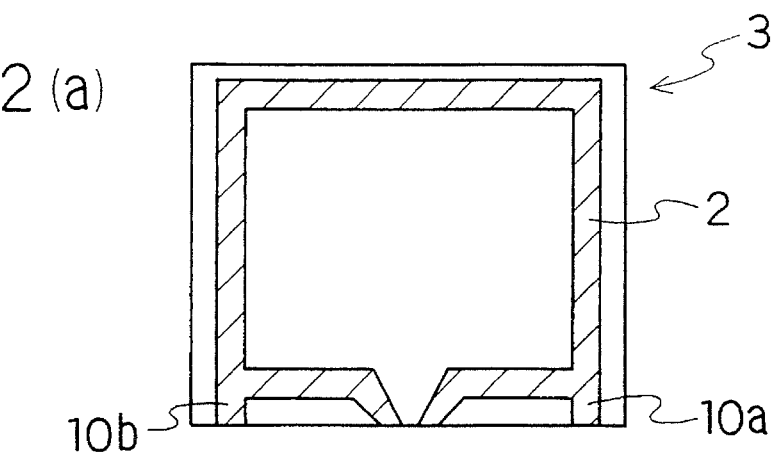
FIG. 2 illustrates in section one example of a method for manufacturing liquid crystal display device according to the present invention.
Figure 2B:
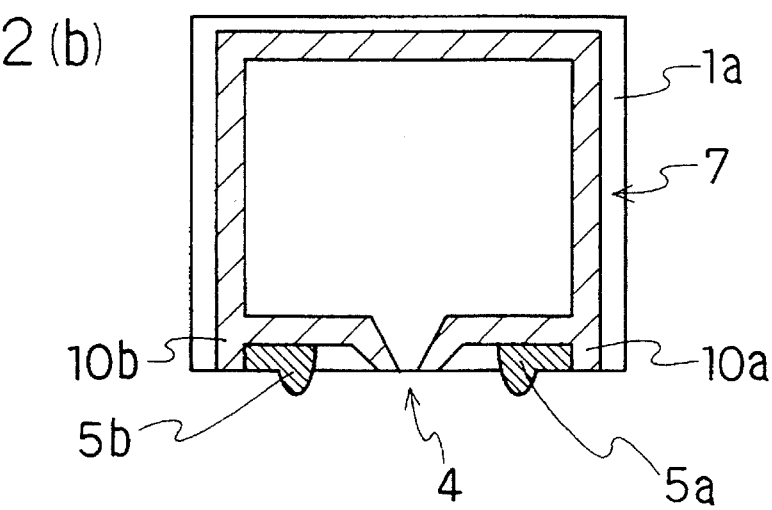
Figure 2C:
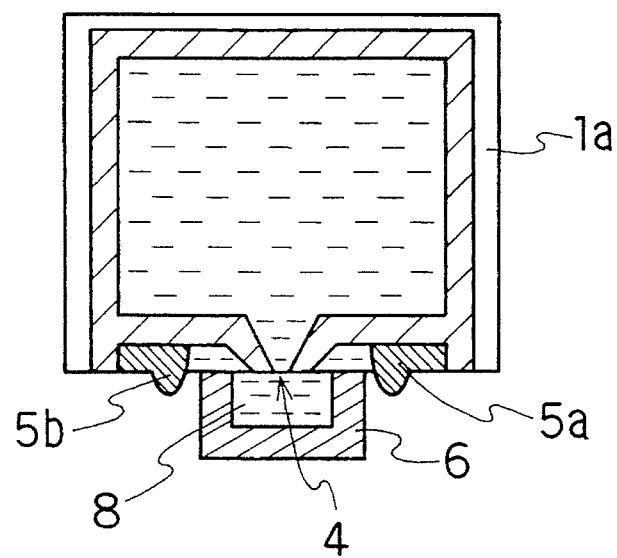
Figure 5:
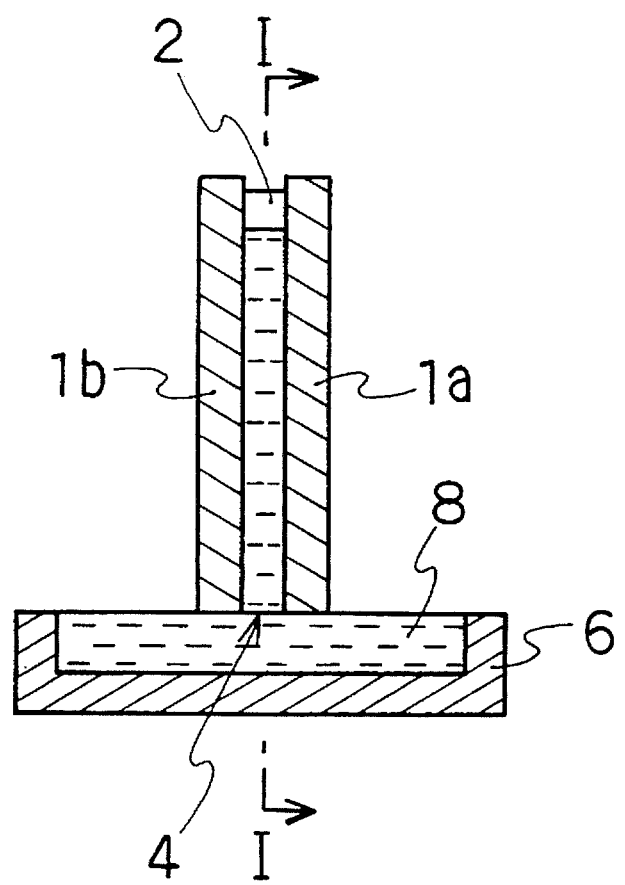
FIG. 5 is an explanatory sectional view for illustrating the manner of introducing a liquid crystal into one example of a prior art liquid crystal display device.
Figure 6:
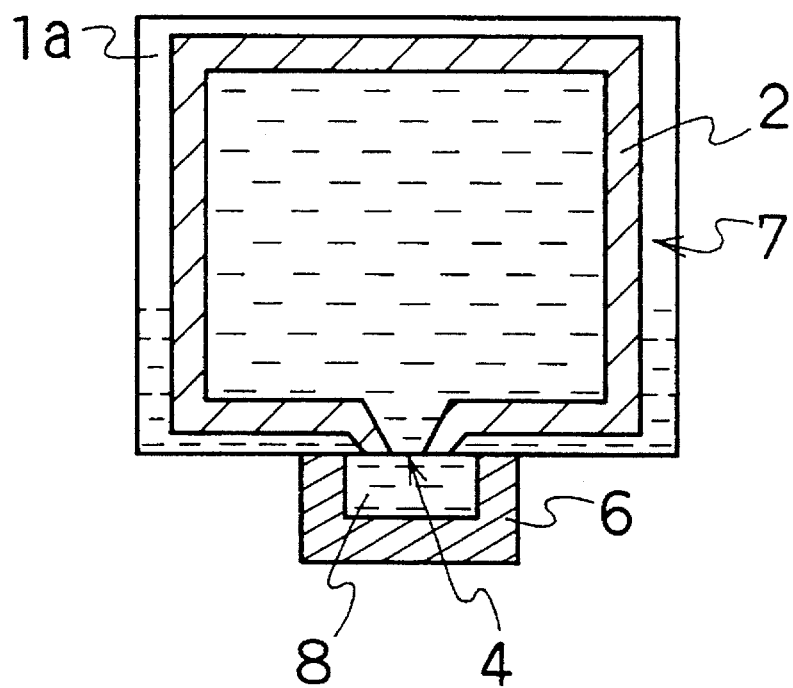
FIG. 6 is a sectional view taken along line I—I of FIG. 5.

To be described next with reference to FIGS. 2(a) to 2(c) is one example of method for manufacturing the liquid crystal display device of the present invention.

First, on a large transparent substrate such as one made of glass are formed an electrode film and the like, and further a sealant layer such as made of an epoxy resin by printing or a like method. The pair of transparent substrates are aligned with each other and superposed with each other. The pair of the substrates is appropriately pressed while heating to cure a sealant layer 2. The pair of transparent substrates is then cut as desired to form a display panel 3 as shown in FIG. 2(a). It is noted that in forming the sealant layer 2 the first sealant stoppers 10a and 10b are formed by extending portions of the sealant layer 2.

Then, as shown in FIG. 2(b), a UV-curable resin or the like is made to attach to portions between opening 4 lying on a side of the pair of substrates and the pair of the first sealant stoppers 10a and 10b by application using a dispenser, screen printing or transfer printing. At this time the amount of the stopper material, such as UV-curable resin, to be applied is adjusted so that the stoppers 5a and 5b would project over the peripheral edge of the transparent substrate 1a. It is noted that the first sealant stoppers 10a and 10b prevent the stopper material from elevating to the circumferential gap 7.

The pair of two transparent substrates bonded is placed in a vacuum chamber to evacuate the clearance defined between the substrates, and then placed on liquid crystal material boat 6 to introduce the liquid crystal material 8 into the clearance through the opening 4, as shown in FIG. 2(c). In this case the pair of substrates is placed on liquid crystal material boat 6 so that the stoppers 5a and 5b would be positioned outside boat 6 to prevent the elevation of the liquid crystal material.

Finally, as shown in FIG. 1, after the introduction of the liquid crystal material is completed, the opening-sealing member 9 is applied to cover the liquid crystal material 8 remaining in the clearance between opening 4 and the stoppers 5a and 5b, and then cured to seal the opening 4. Thereafter, necessary components such as polarizers and backlight are provided to the resulting structure to form a liquid crystal display device.

It should be understood that although the stoppers 5a and 5b are covered with the opening-sealing portion 9 in FIG. 1, they need not necessarily be covered unless the appearance of the device is taken into consideration.

In accordance with this embodiment, the first sealant stoppers 10a and 10b are formed as extending to the peripheral edge of the transparent substrate upon formation of sealant layer 2. Hence, resin for the liquid-crystal-elevation stoppers can be applied to form stoppers 5a and 5b without elevating to the circumference. Further, stoppers 5a and 5b are made to be coplanar with or project over the peripheral edge of the transparent substrates and has a smooth surface. The elevation of the liquid crystal material can, hence, be prevented completely during the introduction of the liquid crystal material.

In corroboration of the effects of the present invention, the following four types of liquid crystal display devices were constructed:

1. devices not provided with both the first sealant stoppers and the liquid-crystal-elevation stoppers;

2. devices provided with the first sealant stoppers only;

3. devices provided with the liquid-crystal-elevation stoppers only; and 4. devices provided with both the first sealant stoppers and the liquid-crystal-elevation stoppers. The above liquid crystal display devices were measured for the rate of occurrence of elevation of the liquid crystal material into the circumference. The results of the measurement were as shown in Table 1.

TABLE 1

| Type of stopper | Rate of occurrence of elevation of liquid crystal material | Remark |
| --- | --- | --- |
| 1. No provision of stopper | 100% | |
| 2. Sealant stopper | about 50– about 70% | |
| 3. Liquid-crystal-elevation stopper | 0% | 5% of devices allowed elevation of UV-curable resin |
| 4. Sealant stopper together with liquid-crystal-elevation stopper | 0% | |

As understood from Table 1, with the liquid crystal display device of the present invention provided with both the liquid-crystal-elevation stoppers and the sealant stoppers, the elevation of the liquid crystal material as well as of the UV-curable resin was completely prevented, while about 50% or more of the devices 2 provided only with the sealant stoppers allowed the elevation of the liquid crystal material. Further, in 5% of the devices 3 provided only with the liquid-crystal-elevation stoppers, the elevation of the stopper material occurred.

FIG. 3 is a cross sectional view illustrating a display panel of another embodiment of a liquid crystal display device of the present invention.

In this embodiment, it is characterized in that not only first sealant stoppers 10a, 10b are provided on both opposite sides relative to the opening 4 for the liquid-crystal-elevation stoppers 5a, 5b, but also second sealant stoppers 12a, 12b are provided on a side of the opening 4 relative to the liquid-crystal-elevation stoppers 5a, 5b (i.e., second sealant stoppers 12a, 12b are provided inside the stoppers 5a, 5b). The second stoppers 12a, 12b are formed into projections extending to the peripheral edges of the transparent substrate 1a at the location inside pair of liquid-crystal-elevation stoppers 5a and 5b, in the same manner as the first stoppers 10a, 10b when the sealant layer is provided. Either of the second stoppers 12a and 12b may be formed inside either of pair of liquid-crystal-elevation stoppers 5a and 5b.

If there are not provided the second sealant stoppers 12a, 12b, the material for the liquid-crystal-elevation stoppers 5a, 5b moves to the side of the 4. It happens that the opening 4 is plugged or narrowed by the material for the liquid-crystal-elevation stoppers 5a, 5b. However, by virtue of the second sealant stoppers 12a, 12b, the material for the stoppers 5a, 5b is prevented from moving to the opening 4. For that reason, prolonging of time for introducing the liquid crystal material or incompletion of introduction of the liquid crystal material caused by narrowing of the opening 4 never comes out.

FIG. 4 is a cross sectional view of the display panel illustrating still another embodiment of the liquid crystal display device of the present invention.

In this embodiment, at least three sealant stoppers 10a, 10b, 12a, 12b, 13a, 13b are formed into projections in a part of the sealant layer 2, each being extended to the peripheral edge of the transparent substrate on both sides of the liquid crystal material introduction inlet 4, the stoppers 5a, 5b are formed in a gap between the first sealant stoppers 10a, 10b and the second sealant stoppers 12a, 12b in the same manner as mentioned above. By virtue of such a construction, even if the material for the stoppers 5a, 5b moves to the gap between the transparent substrates on the side of the opening 4 overlying the second sealant stoppers 12a, 12b when the material for forming the stoppers for the elevating the liquid crystal material is introduced between the first sealant stoppers 10a, 10b and the second sealant stoppers 12a, 12b the third sealant stoppers 13a, 13b prevent the material of the stoppers 5a, 5b from partially or completely plugging the opening 4. As a result, there is not any problem when the liquid crystal material is introduced.

In the embodiment shown in FIG. 4, there are further provided fourth sealant stoppers 14a, 14b in the place opposite to the opening 4. The fourth stoppers 14a, 14b prevent the material of the stoppers 5a, 5b from moving to the gap in the circumference 7 even if the material of the stoppers 5a, 5b overlay the first sealant stoppers 10a, 10b.

As a result, the cleaning method for cleaning the liquid crystal display device after sealed becomes unnecessary, which leads to a significant reduction in the number of production steps and to an improvement in the reliability of liquid crystal display devices.

According to the liquid crystal display device of the present invention, as has been described, there can be completely prevented the elevation of a liquid crystal material into a peripheral gap between the pair of transparent substrates during the introduction of the liquid crystal material, with the stopper material also prevented from elevating into the peripheral gap during the formation of the stoppers.

Though several embodiments of the present invention are described above, it is to be understood that the present invention is not limited only to the above-mentioned, various changes and modifications may be made in the invention without departing from the spirit and scope thereof.

What is claimed is:

1. A liquid crystal display device comprising:

a pair of transparent substrates, a sealant layer provided between the substrates to give spacing by a predetermined distance, an opening formed in a part of the sealant layer, a pair of liquid-crystal-elevation stoppers provided on both sides of the opening and on an outer side of the sealant layer between the substrates, said stoppers including a different member than said sealant layer, said stoppers being coplanar with said peripheral edge, or as to project from said peripheral edge, a liquid crystal material introduced through the opening into the spacing, and a opening-sealing member formed at end in the vicinity of the opening to seal the liquid crystal material within the spacing between the substrates.

2. The liquid crystal display device of claim 1, wherein a part of said sealant layer is extended to a peripheral edge of said transparent substrate to form a first sealant stopper at the location outside either or both of said pair of liquid-crystal-elevation stoppers.

3. The liquid crystal display device of claim 2, wherein a part of said sealant layer is extended to a peripheral edge of said transparent substrate to form a second sealant stopper at the location inside either or both of said pair of liquid-crystal-elevation stoppers.

4. The liquid crystal display device of claim 3, wherein said pair of liquid-crystal-elevation stoppers is made of UV-curable resin.

5. The liquid crystal display device of claim 3, wherein two end portions of said sealant layer which are provided with said opening are extended to a peripheral edge of said transparent substrates.

6. The liquid crystal display device of claim 1, wherein said sealant layer is formed into at least three sealant stoppers in a part of said sealant layer on each side of said opening, said pair of liquid-crystal-elevation stoppers being provided between adjacent two sealant stoppers of said three sealant stoppers.

7. The liquid crystal display device of claim 6, wherein one of said at least three sealant stoppers is provided on a side of said opening with being spaced apart from said adjacent two sealant stoppers.

8. The liquid crystal display device of claim 7, wherein a fourth sealant stopper is provided outside with being spaced apart from said adjacent two sealant stoppers.

9. The liquid crystal display device of claim 6, wherein said pair of liquid-crystal-elevation stoppers is made of UV-curable resin.

10. The liquid crystal display device of claim 1, wherein said pair of liquid-crystal-elevation stoppers is projected from a peripheral of an outer side edge of said substrates by not greater than 0.3 mm.

11. The liquid crystal display device of claim 1, wherein said sealant layer is made of epoxy resin.

12. The liquid crystal display device of claim 1, wherein two end portions of said sealant layer which are provided with said opening are extended to a peripheral edge of said transparent substrates.

13. The liquid crystal display device of claim 1, wherein said opening-sealing member is provided in a manner as to cover said pair of liquid-crystal-elevating stoppers on both sides of said opening.

14. The liquid crystal display device of claim 1, wherein said opening-sealing member is made of UV-curable resin.

* * * * *